United States Patent

Muehlemann et al.

[11] Patent Number: 5,187,765
[45] Date of Patent: Feb. 16, 1993

[54] BACKLIGHTED PANEL

[75] Inventors: Michael M. Muehlemann, Liverpool; Rolf H. Mueller, Auburn, both of N.Y.

[73] Assignee: Fostec, Inc., Auburn, N.Y.

[21] Appl. No.: 734,506

[22] Filed: Jul. 23, 1991

[51] Int. Cl.⁵ .................................. G02B 6/04
[52] U.S. Cl. ......................... 385/115; 385/901; 362/32
[58] Field of Search ............... 385/115–119, 385/901; 362/32

[56] References Cited

U.S. PATENT DOCUMENTS

| 4,172,631 | 10/1979 | Yevick | 385/115 |
|---|---|---|---|
| 4,234,907 | 2/1980 | Daniel | 362/32 |
| 4,466,697 | 6/1984 | Daniel | 385/123 |
| 4,519,017 | 1/1985 | Daniel | 362/32 |
| 4,704,660 | 11/1987 | Robbins | 362/32 |
| 4,761,047 | 8/1988 | Mori | 385/115 |
| 4,825,341 | 4/1989 | Awai | 385/137 |
| 4,845,596 | 11/1989 | Mouissie | 362/32 |
| 5,029,957 | 7/1991 | Hood | 385/27 |

Primary Examiner—John D. Lee
Assistant Examiner—John Ngo
Attorney, Agent, or Firm—Wall and Roehrig

[57] ABSTRACT

A light emitting panel backlighted by an optical fiber assembly is provided in which the individual optical fibers are positioned in parallel across the bottom of a frame and transverse notches are scored in the cladding so as to permit lateral emission of light along the length of the fibers. The lateral emissions impinge on an emitter and are projected onto a diffusing plate mounted in the top of the frame to provide uniform illumination throughout the entire area of the light emitting panel. Increased light throughput is obtained by inducing air flow at the end of the optical fiber bundle to keep the end surface cool by removing the heat from light energy impinging upon the end.

20 Claims, 2 Drawing Sheets

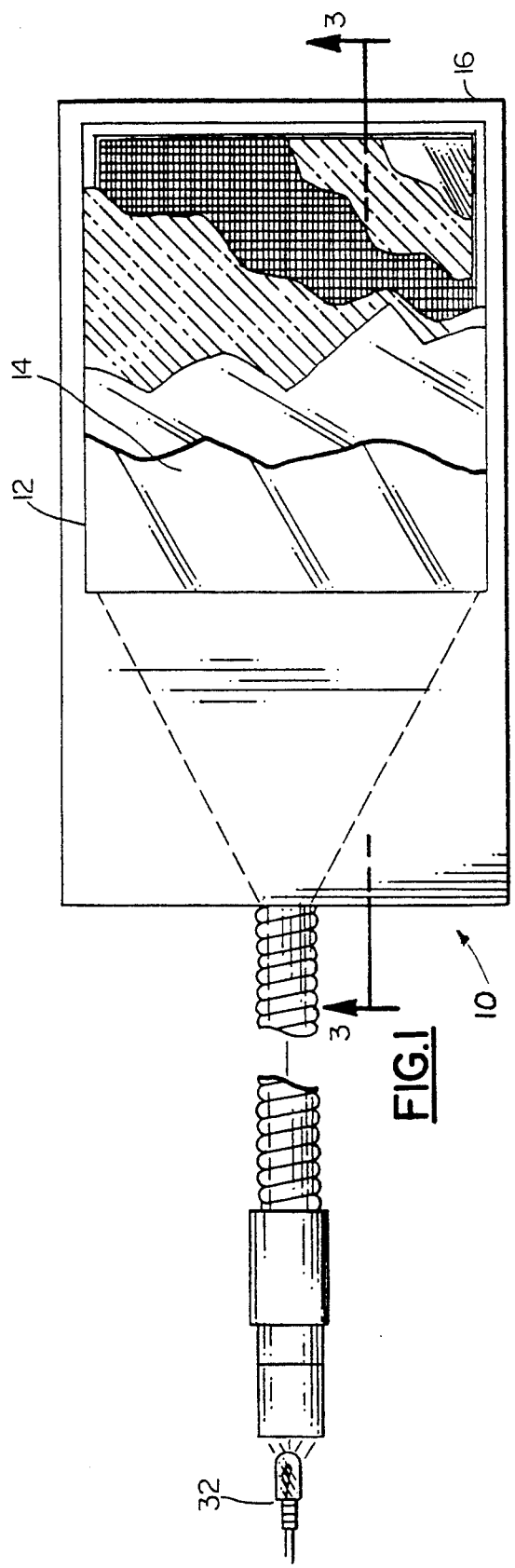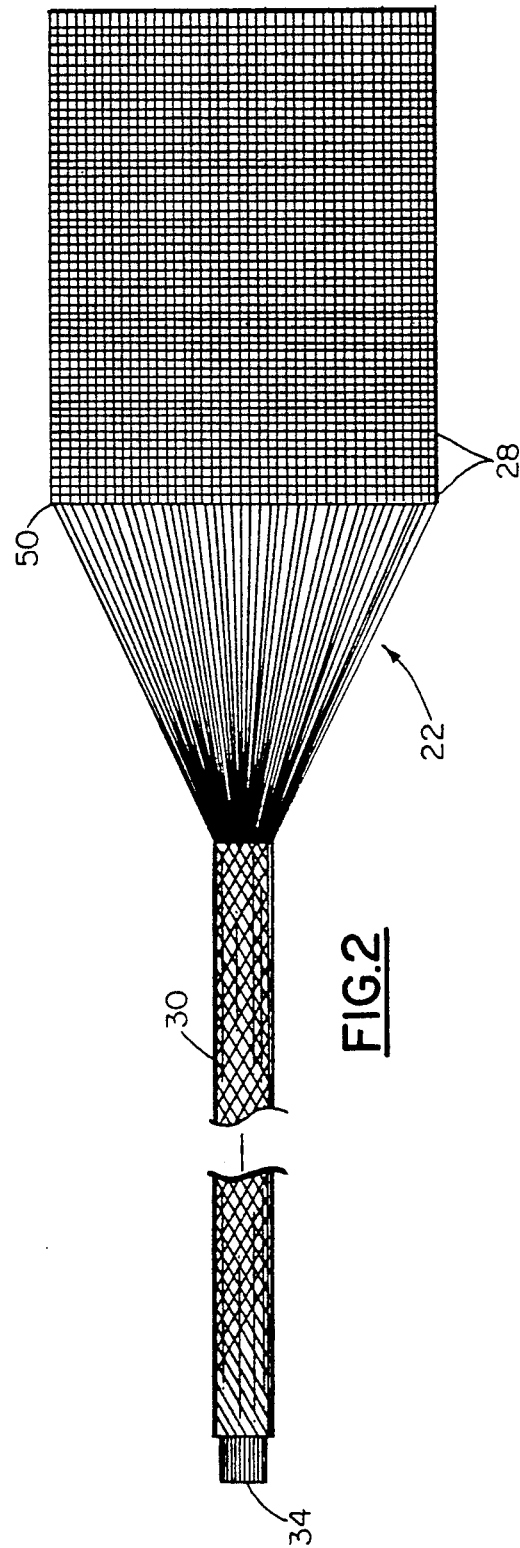

BACKLIGHTED PANEL

BACKGROUND OF THE INVENTION

This invention relates to light emitting optical fiber assemblies generally and more particularly to a panel and method of manufacturing panels backlighted from the surface of a plurality of optical fibers scored at intervals along the surface thereof to emit a portion of the light energy being transmitted along the fiber.

PRIOR ART

A number of different methods have been developed in recent years for causing conventional optical fibers to emit light along the length thereof. U.S. Pat. Nos. 4,234,907, 4,466,697, and 4,519,017 all to Daniel, issued in 1984 and 1985 respectively, show various configurations of panels and fabric formed of optical fibers treated for the lateral emission of light therefrom.

Generally, the lateral emissions have been obtained by scratching, abrading or chemically removing portions of the cladding of the individual optical fibers and/or by doping the internal structure of the core of the optical fiber to cause the light energy to be deflected out through the cladding of the individual fibers without any deformation of the fiber itself.

In forming the prior art panels, a bundle of optical fibers are generally fed to a frame or panel in which the individual fibers are stretched or placed across the frame in a geometric pattern or in the case of fabric in a woven arrangement with the cladding of the fiber, abraded or otherwise removed, at spaced intervals along the optical fibers to permit the escape of the necessary light to provide illumination of a panel. In addition to positioning the fibers in the desired pattern, the density of the cladding openings has been varied from the input end of the panel to the other end of the panel. This was done to provide equivalent light energy throughout the entire area of the panel because the further down the optical fiber the light energy travels, the less energy there is available for lateral emission.

This construction has resulted in non-uniform surface lighting with bright and dark areas, depending on the angle of incidence of the escaping light, and the angle of viewing. One attempt to improve the uniformity and perpendicular light output is the "doping" referred to in U.S. Pat. No. 4,466,697 above.

Another difficulty encountered with prior art devices has been that in order to get as much light energy as possible into the fiber optic bundle, high intensity lamps have been used to illuminate the end of the bundle. In many applications, the end of the optical fiber bundle has become blackened, or even partially melted in the case of plastic optical fibers, which has caused deterioration in the efficiency of the illumination mechanism and loss of lighting efficiency at the light emitting panel. This characteristic has sometimes limited applications to those that do not need as much light intensity as can be obtained with more direct illumination means.

OBJECTS AND SUMMARY OF THE INVENTION

It is therefore an object of this invention to provide a backlighted fiber optic display panel that overcomes the limitations of the prior art.

It is another object of the present invention to provide an illuminated fiber optic panel in which the light is emitted substantially uniformly throughout the entire surface area thereof.

It is a further object of the present invention to provide a backlighted fiber optic panel assembly in which increased light energy can be introduced into the end of the fiber optic bundles without damage to the exposed end thereof.

It is yet another object of the present invention to provide an optical fiber light panel having a plurality of longitudinal optical fibers in parallel, side-by-side relation with discrete transverse notches formed in the cladding of each optical fiber across the panel, with the density, width and depth of said notches being controlled to provide uniform illumination over the entire panel area.

It is a still further object of the present invention to provide an optical fiber panel in which light energy emitted laterally from an optical fiber, as the light is transmitted down the length thereof, is diffused and reflected by a plane surface positioned adjacent the optical fiber area of the panel in intimate contact with the circumference of the individual fibers at the cladding notches so as to yield a uniform, diffused light output.

It is another object of the present invention to provide a backlighted panel having a uniform diffused light emission characteristic across the entire area thereof.

These and other and further objects are attained in one embodiment by placing a plurality of elongated optical fibers in parallel across a panel frame, from one end to the other, with one end of the fibers being bundled together into a fiber optic tube with the end cut and polished and positioned adjacent to a light source. The cladding, of the optical fibers positioned parallel to each other across the panel, is notched at spaced intervals along the lengths thereof with the depth of the notches being greater the further from the input end of the fibers the notches are. The emissions from the notches are diffused and reflected onto a diffusing/polarization panel to illuminate the backlighted panel. Air flow and filtering means are provided at the illumination end of the fiber optic bundle to keep the surface for receiving the light energy cool enough so that it is not blackened or otherwise degraded.

BRIEF DESCRIPTION OF THE DRAWINGS

These and other objects and advantages will become apparent from the following description of the instant invention with reference to the accompanying drawings in which:

FIG. 1 is a top plan view of a panel in accordance with the present invention;

FIG. 2 is a bottom plan view similar to FIG. 1 with the casing removed showing the individual optical fibers and the notches formed in the cladding;

DETAILED DESCRIPTION OF A PREFERRED EMBODIMENT

Figure 3:
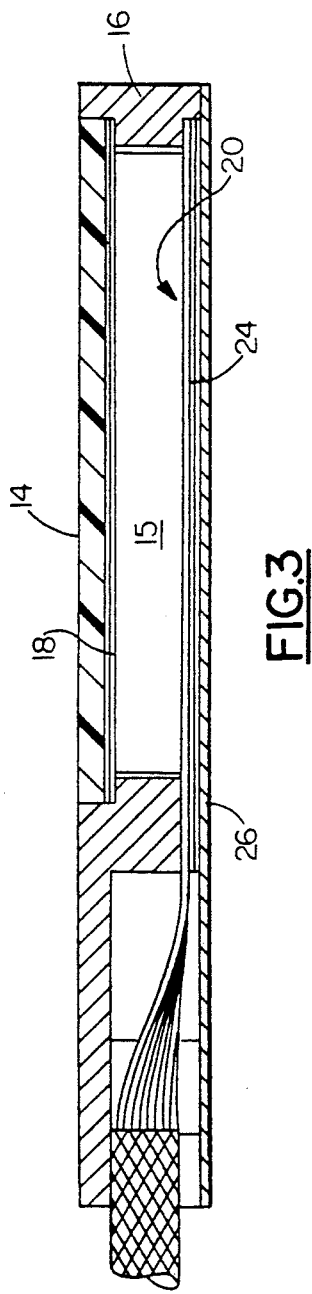
FIG. 3 is a side view partially in cross-section taken on line 3—3 of FIG. 1.

Referring now to FIGS. 1 and 3, there is shown a light emitting panel assembly 10, according to the present invention which has an illuminated area 12 formed by a protective optical cover plate 14 which is mounted in one surface of a frame 16. A diffuser/polarizer member 18 is mounted below plate 14. Frame 16 carries on the other surface an optical fiber grid assembly 20 which may be seen more clearly in FIG. 2. Grid assembly 20 comprises individual optical fibers 22 fixed in parallel abutting side-by-side relationship forming a plane or surface of individual parallel optical fibers, one fiber thick, extending from one end of frame 16 to the other. In the embodiment shown, the optical fibers 22 are made of a plastic material but any suitable light transmitting material such as glass may be used. The individual fibers are clad in a protective coating which reflects light energy impinging at acute angles back into the fiber while light impinging at close to perpendicular will pass therethrough in accordance with the well known practice in the industry. The assembled fibers are mounted on emitter plate 24 and the entire subassembly is covered by housing member 26.

The individual fibers 22 beneath the panel area 12 are parallel as shown in FIG. 2 and have notches 28 indicated by transverse lines in FIG. 2 formed in the cladding at spaced intervals from the input to the other end. The notches 28 are formed in the surface of the fiber cladding facing emitter plate 24. The grooves 28 are etched or otherwise scored into the cladding to remove the cladding from the fibers at each individual scoring 28. This allows light energy travelling down the length of the individual fibers 22 to escape laterally through the surface of the fiber where the cladding has been removed. The individual fibers 22 are gathered from one end of the frame and bundled together into a fiber optic bundle 30 which is clad and protected in the usual manner to form a cable to connect the panel 10 to the light source 32 for illumination of the panel. The individual clad fibers of the grid assembly 20 are mounted on emitter plate 24 with the cladding grooves facing plate 24. Plate 24 is formed of a material that will diffuse and reflect and/or re-emit light energy escaping through the notches in the cladding upwardly in FIG. 3 so as to impinge on the under side of plate 18.

The cladding of the individual fibers 22, as indicated above, while reflecting light energy impinging thereon at acute angles is substantially transparent to light energy impinging on it at angles approaching 90°. Therefore, light energy reflected or re-emitted by plate 24 will, for the most part, pass through the optical fibers 22 and impinge on diffuser plate 18 to provide the uniform backlighting for plate 14. Since light energy tends to escape from the optical fibers 22 at less than right angles to the longitudinal axis, much of the light energy laterally escaping through notches 28 will be diffused and re-emitted by plate 24.

Emitter plate 24 may be a matte white film or plate which diffuses light impinging on it and re-emits the light generally at angles approaching 90° to the plane thereof. Alternatively, emitter plate 24 may include a diffuser layer and reflective mirror layer to accomplish the same effect. Other configurations well known to those skilled in the art may also be used.

The plate 18 on the top side or output side of the display panel is generally a translucent diffusing medium such as ground glass, smoked/etched plastic, diffuser films, opal glass or other material that further diffuses the light energy reflected from plate 24 and the interior surfaces of the frame 16. Diffuser/ polarizer plate 18 may take the form of a layer of diffusing material on the underside of a clear plate 14. Alternatively, plate 14 may be made from a diffusing material and plate 18 may be a layer of polarizing material. The particular combination of diffusing, clear and polarizing effects is chosen for the specific application in which the backlighted panel is to be used. In addition, the inner surfaces of the frame 16 are covered with reflecting mirrors 17 to reflect stray emissions from emitter plate 24 and the optical fibers 22 onto plate 18.

Typically a light ray escaping from an optical fiber 22 (FIG. 3) will be diffused by the emitter plate 24 and re-emitted to project onto plate 18. Those rays reflected at acute angles will be further reflected and diffused by mirrors 17 and the rest of the structure until they impinge plate 18. At the top of chamber 15 the light passes through the diffusing and/or polarizing layer of plate 18 to further scatter and diffuse the illumination of plate 14.

This creates a soft uniform light of a desired intensity for backlighting of objects, displays, instrument panels, decorative panels and the like. It also can be a distributed light source. There is thus provided an energy efficient, uniformly backlighted panel.

The end 34 of the cable 30 is secured in a ferrule or sleeve 36 which compacts and holds the ends of the fiber optic bundle 30 therein. Bundle 30 may have any desired cross sectional shape such as circular, rectangular or other desired configuration. As may be seen in FIG. 4, the ends of the individual fibers when bundled, are cut and polished at the surface 34 to properly receive the light energy from the source 32 and to transmit the maximum amount of light through the surface and down the length of the individual fibers to the panel 10.

The ferrule 36 extends beyond surface 34, and has an open end 38 which permits light from the light source 32 and air to pass therethrough and to impinge on end surface 34 of the optical fibers 22. A filter or other suitable protective member 40 can be inserted in the light path to protect the end of the bundle while allowing maximum transmission of light energy therethrough. This filter may be used for color or other purposes, or for assisting in the protecting of end surface 34 of the optical fiber bundle 30 from the heat generated by the light source 32.

Figure 4:
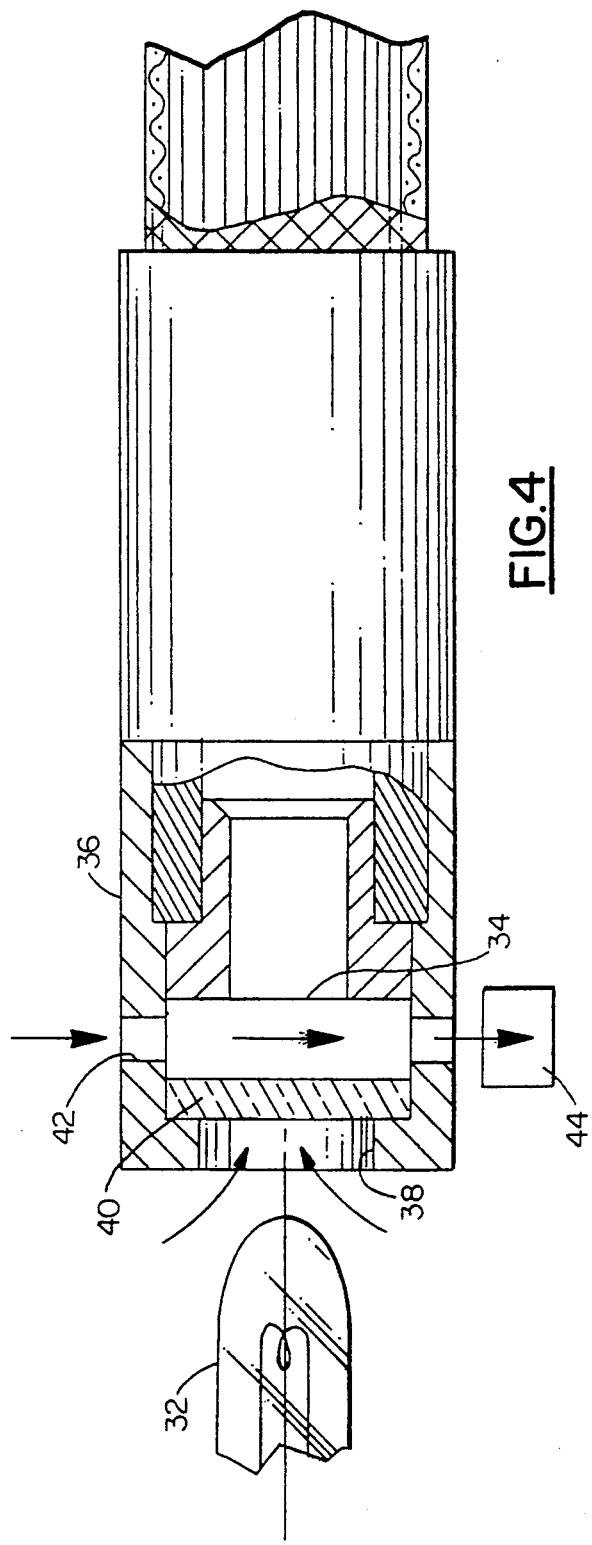
FIG. 4 is a partial cross-sectional view taken through the end of the fiber optic bundle adjacent the light source.

As shown clearly in FIG. 4, there is a transverse hole 42 extending from one side of the ferrule to the other and which passes by the fiber optic bundle face 34. A fan 44 is positioned on one side of the hole 42 so as to draw air through the holes 38 and 42 and direct it across the surface 34. Sufficient flow is provided to prevent degradation of the ends of the optical fibers.

In many prior art installations, especially those using plastic optical fibers, a lightbulb 32 strong enough to provide enough light energy to illuminate the panel, will in relatively short time, cause the surface 34 to degrade and thus cut down on the transmission of light energy. With air moving through the holes 38 and 42 and across the surface 34, the heat energy radiated by the light source 32 is carried outside of the ferrule and the surface 34 is maintained at its desired cool temperature so as not to melt the plastic or diminish its light transmission capability.

In a preferred embodiment, the fan 44 and holes 38 and 42 are sized to provide sufficient air movement across the surface 34 to keep it at a maximum of 60 degrees centigrade. This permits larger lamps to be used and lamps to be placed closer to the end 34 of the fiber optic bundle 30 so that greater amounts of light energy can be transferred into the bundle and better illumination achieved at the display panel portion 12.

The fan 44 can be connected to a control circuit (not shown) for the light source 32 so that whenever the source 32 is turned on, the fan is also turned on to ensure that the fiber optic bundle surface 34 is properly protected.

Referring again to FIGS. 1 and 2, it will be seen that as light is fed down through the optical fiber bundle 30 and through the individual fibers 22 to the panel area 12, each individual fiber carries it own proportionate share of the light energy along the length of the individual optical fiber. As the light travels down these individual fibers from the light source to the other end, the accumulation of losses decreases the light energy from the input to the far end. At the input side 50 of the grid formed by the fibers 22 and the grooves 28, the light energy available for lateral escape through the notches in the cladding on the individual fibers is substantially greater than it is at the far end of the panel 12 after the light energy has passed by all the various notches 28 cut in the cladding of the optical fibers 18.

To compensate for the gradually decreasing light energy available as the light travels down the length of the individual optical fibers, each individual groove 28 is deepened, widened or the number increased, the further away from the input end 50 it is, so as to divert a greater proportion of the available energy laterally out through the surface of the individual fibers. This depth, width and density gradient can be determined for any individual panel and optical fiber material so as to yield the maximum possible uniform illumination throughout the entire area of the backlighted panel 10.

It will thus be seen that we have provided a novel and improved optical fiber illuminated panel with superior uniformity of light output in an economical and easily manufactured manner.

While this invention has been explained with reference to the structure disclosed herein, it is not confined to the details as set forth and this application is intended to cover any modifications and changes as may come within the scope of the following case.

What is claimed is:

1. An optical fiber light emitting panel for providing a uniform area lighting effect which comprises:
   a plurality of cladded optical fibers arranged in abutting side-by-side relationship and extending over a predetermined area;
   a proximal segment of said optical fibers being formed into a bundle with the proximal end of said fibers adapted to be positioned adjacent a light source;
   a plurality of openings scored through an intact cladding layer of each of said optical fibers at spaced intervals therealong over one surface of said area, said scored openings having an attribute selected from the group of depth, width and density that varies according to a gradient in an axial direction of said fibers; and
   first light diffuser/emitter means mounted in close proximity to the scored optical fiber surface throughout said predetermined area so that when the end of the bundle of optical fibers is illuminated, light will escape through said openings in the cladding and be diffused and re-emitted by said light emitter means to provide a uniform diffused light emanating from the surface of the panel.

2. A panel according to claim 1 including panel supporting means mounted on said light emitter means on the side opposite said optical fibers;
   a second diffuser/emitter plate mounted adjacent the unscored surface of said optical fiber area to receive thereon light emitted from said first light diffuser/emitter means.

3. A panel according to claim 1 wherein said first light diffuser/emitter means is mounted in surface contact with the scored, surface area of said optical fibers.

4. A light emitting panel according to claim 1 further including:
   a ferrule having an open end fixed about the end of the fiber optic bundle so that light may be directed on the end of the fiber bundle through said end;
   a transverse duct means passing between the end of the optical fiber bundle and the open ferrule end; and
   fan means mounted adjacent one end of said duct means to draw cooling air over the end of the bundle to prevent degradation thereof when illuminated.

5. A panel according to claim 1, wherein a scored opening disposed at a distance from the proximal end of a said fiber has a greater depth than another scored opening disposed therebetween.

6. A panel according to claim 1, wherein a scored opening disposed at a distance from the proximal end of a said fiber has a greater width than another scored opening disposed therebetween.

7. A panel according to claim 1, wherein the density of scored openings in a first region of a said fiber disposed at a distance from the proximal end thereof greater than the density of scored openings in a second region disposed therebetween.

8. A light emitting panel assembly comprising:
   a supporting frame member having top and bottom faces;
   a first light emitter plate means mounted adjacent one face of said frame;
   a second light emitter plate means mounted adjacent the other face of said frame member;
   a plurality of cladded optical fibers positioned in said frame member in close proximity to said second light emitter plate means;
   one end of said cladded optical fibers being collected into a bundle with the end of the bundle mounted in operative relationship to a light source;
   a plurality of notches scored in the cladding of said cladded optical fibers facing said second light emitter plate means to allow light energy to escape therefrom;
   said notches being formed at an angle to the axis of said optical fibers at spaced apart intervals from the light input end to the other end of said optical fibers;
   said escaping light energy impinging on said second light emitter plate so that the light will be diffused and re-emitted by said second light emitter plate means to project onto said first light emitter plate means on the other side of said frame when the end of said fiber bundle is illuminated.

9. A light emitting panel assembly according to claim 8, wherein the optical fibers are aligned in abutting side-by-side parallel longitudinal relation in said frame and said notches are formed at substantially right angles to the length of said optical fibers.

10. A light emitting panel according to claim 8, wherein said notches are formed with the width, depth and/or density of notches increasing in proportion to the distance from the input end of the optical fibers.

11. A light emitting panel according to claim 8, wherein said first and second light emitter plate members comprise a plate of frosted, translucent material.

12. A light emitting panel assembly according to claim 8, wherein the interior surfaces of said frame member are covered with light reflecting means.

13. A light emitting panel assembly according to claim 12, wherein said light reflecting means comprises a plurality of mirrors.

14. A light emitting panel assembly according to claim 8, wherein said second light emitter plate means comprises a mirror positioned to reflect light escaping through said notches in the optical fiber cladding up through said optical fibers.

15. A light emitting panel assembly according to claim 14, wherein said emitter plate means includes a layer of light diffusing material.

16. A light emitting panel assembly according to claim 8, wherein said first light emitter plate means comprises a layer of light diffusing material.

17. A light emitting panel assembly according to claim 16 wherein said first light emitter plate means includes a layer of light polarizing material on the top surface thereof.

18. A light emitting panel assembly according to claim 17, wherein said first light emitter plate means includes a clear optical cover plate on the top thereof to protect and enclose said first emitter plate means.

19. The method of forming a backlighted fiber optic display panel which comprises:
   mounting a plurality of cladded optical fibers in abutting side-by-side relation across one side of a frame member;
   mounting light diffusing means on the other side of the frame member;
   forming a plurality of notches through an intact cladding layer of said optical fibers on the surface opposite said light diffusing means to cause light to escape therefrom, said notches having an attribute selected from the group of depth, width and density that varies according to a gradient in an axial direction of said fibers;
   positioning light emitting means adjacent the notches formed in said optical fiber cladding to reflect light escaping therefrom onto said light diffusing means.

20. The method according to claim 19 including controlling the width, depth and/or density of said plurality of notches to provide the desired illumination throughout the surface area of the panel.

* * * * *